United States Patent [19]

Renzi et al.

[11] Patent Number: 5,310,841
[45] Date of Patent: May 10, 1994

[54] LIQUID COMPOSITION POLYMERIZABLE TO YIELD ORGANIC GLASSES WITH LOW WATER ABSORPTION AND HIGH THERMAL STABILITY

[75] Inventors: Fiorenzo Renzi, Gorgonzola; Franco Rivetti, Schio; Ugo Romano, Vimercate, all of Italy

[73] Assignee: Enichem Synthesis S.p.A., Palermo, Italy

[21] Appl. No.: 590,498

[22] Filed: Sep. 26, 1990

Related U.S. Application Data

[63] Continuation of Ser. No. 285,045, Dec. 15, 1988, abandoned.

[30] Foreign Application Priority Data

Dec. 18, 1987 [IT] Italy .................. 23083 A/87

[51] Int. Cl.$^5$ .................. C08F 18/24; C08F 222/12; C08F 222/26
[52] U.S. Cl. .................. 526/314; 526/328.5; 526/330
[58] Field of Search .................. 526/314, 328.5, 330

[56] References Cited

U.S. PATENT DOCUMENTS 3,699,727  7/1972  Berry et al. .................. 526/314
3,751,374  8/1973  Berry et al. .................. 526/314

FOREIGN PATENT DOCUMENTS 63173001  12/1987  Japan .................. 526/314

OTHER PUBLICATIONS

C. E. Schildknecht, *Polymer Processes*, vol. X, (1956) pp. 181, 473 and 762–767.
Hackh, *Chemical Dictionary* (1972), p. 473.

*Primary Examiner*—Joseph L. Schofer
*Assistant Examiner*—Wu C. Cheng
*Attorney, Agent, or Firm*—Shea & Gould

[57] ABSTRACT

A liquid composition, polymerizable by free-radical polymerization to yield organic glasses which are endowed with characteristics of low water absorption and high thermal stability, is constituted by the product of transesterification of diallyl-carbonate with a cycloaliphatic diol or a mixture of cycloaliphatic diols, from among said diols 1,4-cyclohexane-di-methanol and 3(4),8(9)-bis-(hydroxymethyl)tricyclo[5.2.1.0$^{2.6}$]decane being preferred.

6 Claims, No Drawings

LIQUID COMPOSITION POLYMERIZABLE TO YIELD ORGANIC GLASSES WITH LOW WATER ABSORPTION AND HIGH THERMAL STABILITY

This is a continuation of copending application with Ser. No. 07/285,045, filed on Dec. 15, 1988, now abandoned.

The present invention relates to a liquid composition, polymerizable, by means of free-radical polymerization, into organic glasses showing a low water absorption and a high thermal stability (a high heat distortion temperature and a high resistance to yellowing).

The invention relates as well to the organic glasses which can be obtained from said composition.

Among the plastic materials useful as organic glasses, the most interesting ones from a commercial viewpoint are poly(methyl-methacrylate), polycarbonate and polystyrene. Even if they are widely used in the industrial practice for many applications, these materials suffer from some drawbacks, which limit their use as optical elements, e.g., in optical disks, optical papers, wave guides, optical fibres, and optical lenses. A characteristic they share with one another is a poor resistance to abrasion and to the solvents. Furthermore, poly(methyl-methacrylate) shows a high water retention in prolonged-dipping tests, whilst polycarbonate and polystyrene, which do not suffer from this drawback, show a considerably high birefringence.

The thermosetting organic glasses are known to be more resistant to abrasion and to the solvents, and, among these, those organic glasses which derive from the polymerization of polyol allyl-carbonates, in particular, of diethylene-glycol bis(allyl-carbonate), deserve a prominent commercial interest, in view of the peculiar characteristics of clearness, resistance to abrasion, to the solvents and to ageing. See, e.g., F. Strain in "Encyclopaedia of Chemical Processing and Design", 1st Edition, Dekker Inc., New York, Vol. I, pages 799-- foll., Interscience Publishers, New York, 1964.

Unfortunately, the products from the polymerization of diethylene glycol bis(allyl-carbonate) suffer from limitations in the above cited application sectors, deriving from the relatively high values of water absorption in tests with prolonged dipping, and of relatively low thermal stability at a high temperature.

The present Applicant has found now that these drawbacks can be overcome, or, at least, considerably reduced, by means of a liquid composition of the present invention, which can be polymerized by free-radical polymerization, to yield organic glasses endowed with characteristics of low water absorption and high thermal stability (high heat distorsion temperature, and high resistance to yellowing), together with good optical and mechanical characteristics.

More particularly, the liquid composition of the present invention is constituted by a mixture of either monomer or oligomer bis(allyl-carbonates) of one or more cycloaliphatic diols, obtained by means of the reaction, under transesterification conditions, of a diallyl-carbonate with a cycloaliphatic diol, or with a mixture of cycloaliphatic diols, with a molar ratio of said diallyl-carbonate to said diol or diols equal to, or higher than, to a value comprised within the range of from 2:1 up to 18:1.

Among the cycloaliphatic diols, 1,4-cyclohexanedimethanol:

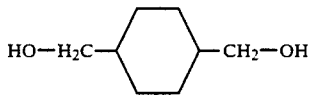

and 3(4),8(9)-bis-(hydroxymethyl)tricyclo[5.2.1.0$^{2.6}$]-decane:

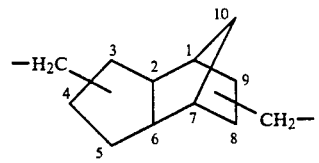

[hereinunder denominated, in short form, as "bis(hydroxymethyl)tricyclo-decane"], are preferred.

In the preferred form of practical embodiment, the composition according to the present invention is the reaction product, under conditions of transesterification, of a diallyl-carbonate and 1,4-cyclohexane-dimethanol in a mutual molar ratio comprised within the range of from 3:1 to 6:1, or of a diallyl-carbonate and bis(hydroxymethyl)-tricyclo-decane in a mutual molar ratio comprised within the range of from 6:1 to 18:1.

In particular, the transesterification reaction is carried out by bringing the reactants into contact, in the above indicated proportions, with the process being carried out at temperatures comprised within the range of from 80° to 160° C., and preferably of from 90° to 130° C., in the presence of a catalyst of alkaline character, with the allyl alcohol formed in the reaction being continuously removed.

Catalysts suitable for the intended purpose are alkali-metal hydroxides, carbonates and alkoxides, the organic bases and the basic ion-exchange resins. Specific catalyst examples are sodium hydroxide, sodium carbonate and sodium methoxide. The catalyst is advantageously used in an amount of at least 1 ppm (one part per million parts by weight), relative to the cycloaliphatic diol, and, preferably, in an amount of the order of 0.01-0.3% by weight relative to said diol.

The reaction is advantageously carried out under such a pressure, as to bring the system to the boil at the preselected operating temperature, so as to favour the elimination of the allyl alcohol from the reaction mixture. For example, pressure values comprised within the range of from 20 to 760 torr, and preferably of from 50 to 400 torr, are suitable for the intended purpose. Under the above stated conditions, the reaction times are generally comprised within the range of from 0.5 to 20 hours, and typically are of the order of from 0.5 to 2 hours.

At the end of the reaction, the mixture is cooled and washed with water in order to remove the small catalyst amounts and, after de-mixing and separation of the aqueous phase, the unconverted diallyl-carbonate is distilled off, by heating the reaction mixture up to temperatures of the order of 120° C., under a reduced pressure down to values of the order of 0.1-20 torr, and preferably of 1-3 torr, with the desired composition being obtained as the residue.

If necessary, this composition is submitted to filtration, after a preliminary optional treatment with activated charcoal.

The composition according to the present invention is liquid at room temperature, and shows values of viscosity comprised within the range of from 50 to 300 cst, and of specific gravity, of the order of from 1.10 to 1.20 g/ml. This composition is constituted by either monomer or oligomer bis-(allyl-carbonates) of the cycloaliphatic diol used, with an amount of oligomers which is generally comprised within the range of from 10 to 70% by weight.

More particularly, in the preferred form of practical embodiment, according to which the diallyl-carbonate and 1,4-cyclohexane-dimethanol are reacted with each other in a molar ratio comprised within the range of from 3:1 to 6:1, the resulting composition contains from about 25 to about 50% by weight of oligomers, as a function of the selected ratio between the reactants. Furthermore, in the preferred form of practical embodiment, according to which the diallyl-carbonate and bis(hydroxymethyl)-tricyclo-decane are reacted with each other in a molar ratio comprised within the range of from 6:1 to 18:1, the content of oligomers in the resulting composition is comprised within the range of from about 10 to about 30% by weight.

The composition according to the present invention may contain up to 30% by weight, as referred to the end mixture, of one or more vinylic or acrylic monomers, examples for which are vinyl acetate, butyl (meth)acrylate, 2-ethyl-hexyl (meth)acrylate, benzyl (meth)acrylate, cyclohexyl (meth)acrylate, and phenyl (meth)acrylate.

Furthermore, the composition may additionally contain one or more additives, such as stabilizers, lubricants, dyes, pigments, U.V. and I.R. light absorbers, and the like, anyway in a total amount not larger than 1 part by weight per each 100 parts by weight of the same composition.

The composition according to the present invention can be transformed into organic glasses by means of free-radical polymerization, with the usual casting technique. For such a purpose, to the composition one or more polymerization initiators, soluble in the same composition, and capable of generating free radicals within a temperature range comprised from about 30° to 120° C. are added. Preferred examples of such initiators are di-cyclohexyl-peroxy-dicarbonate, di-isopropyl-peroxy-dicarbonate, di-benzoyl-peroxide, di-sec.-butyl-peroxy-dicarbonate, and sec.-butyl-cyclohexyl-peroxy-dicarbonate. The amount of the initiator can be generally comprised within the range of from 1 to 6 parts by weight per each 100 parts by weight of the composition.

The conversion of the initiator-containing composition into the organic glass takes place at temperatures comprised within the range of from about 35° to about 120° C., with polymerization times which may generally be comprised within the range of from 1 to 100 hours.

During the polymerization, phenomena of reduced volume shrinkage occur, and the so obtained organic glasses are endowed with characteristics of low water absorption, and high thermal stability (a high heat distortion temperature, and a high resistance to yellowing), and that, together with good general optical and mechanical characteristics.

The following experimental examples are given for merely exemplifying purposes, and it should be understood that in no way is the invention limited to them, or by them. In these examples, the liquid, polymerizable composition is prepared by reacting, under transesterification conditions, diallyl-carbonate and 1,4-cyclohexane-dimethanol or bis(hydroxymethyl)tricyclo-decane. To the so obtained liquid composition, di-cyclohexyl-peroxy-dicarbonate is added as the initiator, in the amount of 5% by weight, as referred to the weight of the mixture. The composition which contains the initiator is converted by polymerization into flat sheets of 3 mm of thickness by means of the conventional casting technique. According to this technique, the composition is poured into the hollow of a mould obtained by assembling two sheets of FLOAT glass, with a spacer gasket of plasticized poly(vinyl chloride).

The whole is then submitted to polymerization, by being heated for 72 hours inside a forced air circulation oven, at the temperature of 48° C. At the end of this time, the moulds are opened, and the polymerized sheets are recovered and are maintained for 2 hours at 110° C., in order to decompose any possible initiator residues.

On the so-obtained sheets, the following characteristics are determined:

a) Optical Characteristics

Refractive index ($n_D^{20}$): measured by means of the Abbe's refractometer (ASTM D-542).

Haze and transmittance within the visible range (%): measured by using the Gardner's Hazegard XL-211 (ASTM D-1003).

Yellow index (YI), defined as:

$$YI = \frac{100}{Y} (1.277\, X - 1.06\, Z)$$

as determined by means of the Gardner's colorimeter XL-805 (ASTM D-1925).

b) Physical and Mechanical Characteristics

Specific gravity: As determined by means of the hydrostatic balance at the temperature of 25° C. (ASTM D-792).

Volume shrinkage during polymerization ("shrinkage"): As computed by means of the following formula:

$$\text{shrinkage \%} = \frac{(\text{polymer density} - \text{monomer density})}{(\text{polymer density})} \times 100$$

Rockwell hardness (M): Measured by means of the Rockwell durometer (ASTM D-785).

Ultimate strength and elastic modulus at bending (ASTM D-790).

Water absorption: As measured by dipping a specimen of 27×34×3 mm of dimensions in water, and determining the weight increase with time (ASTM D-543, modified).

c) Thermal Characteristics

Heat Distortion Temperature under a load of 1.82 mPa (HDT) (ASTM D-648).

Thermal stability: As measured by determining the change in Yellow Index after a thermal treatment of 5 hours at the respective temperatures of 150° C., 170° C., and 190° C.

EXAMPLE 1

To a jacketed, three-necked flask equipped with thermometer and stirring means, and with an overhanging distillation column with 20 perforated trays, 201.6 g (1.4 mol) of 1,4-cyclohexane-dimethanol, 759 g (5.6 mol) of diallyl-carbonate and 0.30 ml of a solution at 30% by weight of sodium methoxide in methanol are charged.

The reaction is allowed to proceed for 1 hour and 15 minutes under a pressure of 150 torr, with the allyl alcohol formed during the reaction being distilled off (163 g in total; purity 99.6%). After cooling, the reaction mixture is washed twice, each time with 500 ml of distilled water. The excess of diallyl-carbonate is distilled off from the reaction mixture by operating under 1 torr, and up to an end temperature of 120° C. The obtained product is decolorized by being brought into contact with 2% by weight of activated charcoal, for 4 hours at 80° C., and is subsequently filtered.

In this way, 385 g is obtained of a liquid product, which has the following characteristics:

| | |
|---|---|
| viscosity (25° C.) | 90.6 cst |
| specific gravity (20° C.) | 1.107 g/ml |
| refractive index ($n_D^{20}$) | 1.4735 |
| colour (APHA) | 10 |

The product consists of monomer and oligomer 1,4-cyclohexane-dimethanol bis(allyl carbonates), with the following hypothesized distribution:

$$CH_2=CH-CH_2-O-\overset{O}{\underset{\|}{C}}-O-(R-O-\overset{O}{\underset{\|}{C}}-O)_{\overline{n}}CH_2-CH=CH_2$$

wherein: R =

$$-CH_2-\left\langle\phantom{X}\right\rangle-CH_2-$$

| monomer | n = 1 | 64% by weight |
|---|---|---|
| dimer | n = 2 | 25% by weight |
| trimer | n = 3 | 8% by weight |
| tetramer | n = 4 | 3% by weight |

EXAMPLE 2

The reaction product from Example 1, after the addition of dicyclohexyl-peroxy-dicarbonate in an amount of 5% by weight, as referred to the weight of the same mixture, is submitted to polymerization under the same condition as reported in the disclosure, and on the hardened compositions, the characteristics are determined, which are reported in Table 1, under the "Test 1" heading.

In the same Table, under the "Test 2" heading, the corresponding values are reported, of the product obtained by hardening diethylene glycol bis(allyl carbonate), according to the prior art.

TABLE 1

| | Test 1 | Test 2 |
|---|---|---|
| Specific gravity (g/ml) | 1.2093 | 1.3111 |
| Shrinkage (%) | 8.5 | 12.3 |
| $n_D^{20}$ | 1.5053 | 1.5010 |
| Haze (%) | 0.35 | 0.16 |
| Transmittance in the visible range (%) | 92.5 | 93.3 |
| Yellow index | 1.18 | 1.20 |
| Ultimate strength at bending (MPa) | 32 | 79 |
| Elastic modulus at bending (MPa) | 2330 | 2300 |
| Rockwell hardness (M) | 106 | 97 |

TABLE 1-continued

| | Test 1 | Test 2 |
|---|---|---|
| IZOD impact strength without notch (kJ/m²) | 5.8 | 17.2 |
| HDT (°C.) | 173 | 66 |

In Table 2, the water absorption values are reported, which are determined in the prolonged dipping tests on the hardened products from Test 1 and Test 2, together with the corresponding values as determined on poly(methyl methacrylate) (Test 3).

TABLE 2

| | Absorbed water (% weight change) | | |
|---|---|---|---|
| | 1 day | 7 days | 15 days |
| Test 1 | 0.11 | 0.38 | 0.38 |
| Test 2 | 0.27 | 0.67 | 0.96 |
| Test 3 | 0.34 | 0.81 | 1.14 |

In Table 3, the yellow index values are reported, which are measured on the hardened products of Test 1 and Test 2, after a thermal treatment of 5 hours at the respective temperatures of 150° C., 170° C., and 190° C.

TABLE 3

| | Change in yellow index | | |
|---|---|---|---|
| | 150° C. | 170° C. | 190° C. |
| Test 1 | −0.29 | +0.45 | +3.74 |
| Test 2 | +2.95 | +6.11 | +14.23 |

EXAMPLE 3

To the same equipment as disclosed in Example 1, 196.3 g (1.0 mol) of bis(hydroxymethyl)-tricyclo-decane, 1704 g (12.0 mol) of diallyl-carbonate and 0.8 ml of a solution at 30% by weight of sodium methoxide in methanol are charged.

The reaction is allowed to proceed for 30 minutes at a temperature of 105°–120° C. ad under a pressure of 150 torr, with the allyl alcohol formed during the reaction being distilled off (116 g). After cooling, the reaction mixture is washed twice, each time with 500 ml of distilled water, in order to bring it to a neutral pH. The excess of diallyl-carbonate is distilled off under a reduced pressure of 1 torr, and up to an end temperature of 120° C. The reaction product is decolorized by being brought into contact with 2% by weight of activated charcoal, for 4 hours at 80° C., and is subsequently filtered.

In this way, 370 g is obtained of a liquid product, which has the following characteristics:

| | |
|---|---|
| viscosity (25° C.) | 195 cst |
| specific gravity (25° C.) | 1.14 g/ml |
| refractive index ($n_D^{20}$) | 1.4935 |
| colour (APHA) | 30 |

The product consists of monomer and oligomer bis(hydroxymethyl)-tricyclo-decane bis(allyl carbonates), with the following hypothesized distribution:

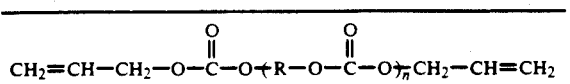

wherein: R =

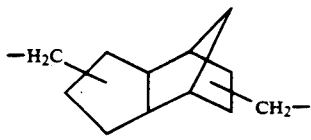

| | | |
|---|---|---|
| monomer | n = 1 | 87.6% by weight |
| dimer | n = 2 | 11.2% by weight |
| trimer | n = 3 | 1.2% by weight |

EXAMPLE 4

The reaction product from Example 3, after the addition of dicyclohexyl-peroxy-dicarbonate (5% by weight, as referred to the weight of the same mixture), is submitted to polymerization under the same conditions as of Example 2, and on the hardened compositions, the characteristics are determined, which are reported in Table 4.

TABLE 4

| | |
|---|---|
| Specific gravity (g/ml) | 1.2257 |
| Shrinkage (%) | 7.6 |
| $n_D^{20}$ | 1.5215 |
| Haze (%) | 0.22 |
| Transmittance in the visible range (%) | 91.6 |
| Yellow index | 2.27 |
| Ultimate strength at bending (MPa) | 96 |
| Elastic modulus at bending (MPa) | 3300 |
| Rockwell hardness | 112 |
| IZOD impact strength without notch (kJ/m²) | 13.1 |
| HDT (°C.) | 90.1 |
| Absorbed water (% weight change) | |
| after 1 day | 0.08 |
| after 7 days | 0.19 |
| after 15 days | 0.25 |

We claim:

1. A liquid polymer organic glass composition having low water absorption and high thermal stability, comprising a mixture of monomeric and oligomeric bis(allyl carbonates) which are the transesterification reaction product of:
   (a) a diallyl-carbonate, and
   (b) 1,4-cyclohexane dimethanol, with a molar ratio of the diallyl-carbonate to the 1,4-cyclohexane dimethanol of from 3:1 to 6:1.

2. The composition according to claim 1 wherein the reaction product is a mixture of monomeric, oligomeric, or both monomeric and oligomeric forms of a bis(allylcarbonate) of the cycloaliphatic diol.

3. The composition according to claim 1 further comprising up to 30% by weight relative to the composition of at least one vinylic or acrylic monomer selected from the group consisting of: vinyl acetate, butyl (meth)acrylate, 2-ethyl-hexyl (meth)acrylate, cyclohexyl (meth)acrylate, and phenyl (meth)acrylate.

4. The composition according to claim 1 further comprising at least one additive selected from the group consisting of: stabilizers, lubricants, dyes, U.V. and I.R. light absorbers, in an amount not larger than 1 part by weight per each 100 parts by weight of the composition.

5. The composition according to claim 1 further comprising at least one polymerization initiator, soluble in the composition, and capable of generating free radicals within a temperature range of from about 30° to 120° C., in an amount from 1 to 6 parts by weight per each 100 parts by weight of the composition.

6. Organic glasses obtained by polymerization of the composition according to any of the preceding claims by a casting technique.

* * * * *